United States Patent
Gong

(10) Patent No.: US 7,084,578 B2
(45) Date of Patent: Aug. 1, 2006

(54) SYSTEM AND METHOD FOR PREVENTING ACOUSTIC ARC RESONANCE IN A HID LAMP

(76) Inventor: Mingfu Gong, 10284 Alpine Dr., Cupertino, CA (US) 95014

( * ) Notice: Subject to any disclaimer, the term of this patent is extended or adjusted under 35 U.S.C. 154(b) by 0 days.

(21) Appl. No.: 10/843,282

(22) Filed: May 10, 2004

(65) Prior Publication Data

US 2004/0217716 A1 Nov. 4, 2004

Related U.S. Application Data

(63) Continuation-in-part of application No. 10/122,061, filed on Apr. 12, 2002, now abandoned.

(51) Int. Cl.
*G05F 1/00* (2006.01)
*H05B 41/16* (2006.01)

(52) U.S. Cl. .................. 315/194; 315/291; 315/247

(58) Field of Classification Search ............ 315/247, 315/291, 324, 317, 219, 194
See application file for complete search history.

(56) References Cited

U.S. PATENT DOCUMENTS

| | | | | |
|---|---|---|---|---|
| 4,682,084 A | * | 7/1987 | Kuhnel et al. | 315/307 |
| 4,686,428 A | * | 8/1987 | Kuhnel et al. | 315/307 |
| 5,068,578 A | * | 11/1991 | Wegener | 315/307 |
| 5,872,429 A | * | 2/1999 | Xia et al. | 315/194 |
| 6,326,740 B1 | * | 12/2001 | Chang et al. | 315/291 |
| 6,650,069 B1 | * | 11/2003 | Kito | 315/308 |
| 6,750,620 B1 | * | 6/2004 | Suzuki | 315/291 |
| 6,791,286 B1 | * | 9/2004 | Matsumoto | 315/308 |
| 2002/0041165 A1 | * | 4/2002 | Cammack | 315/291 |

* cited by examiner

*Primary Examiner*—Thuy V. Tran
*Assistant Examiner*—Angela M Lie
(74) *Attorney, Agent, or Firm*—James Cai; Douglas MacKenzie Schein & Cai LLP

(57) ABSTRACT

A method of preventing acoustic arc resonance (AAR) in a high frequency electronic ballast for a High-Intensity-Discharge (HID) lamp, includes the step of providing a phase modulated signal to the HID lamp, the phase modulated signal being provided by a pulse source working at a Pulse-Phase-Modulation (PPM) mode with a fixed frequency.

29 Claims, 7 Drawing Sheets

(a). Two phase PPM with frequency = 1/T

0011010010000101011101100011111

(b). Two phase ($2^5-1$) pseudo random sequence (a). Three phase PPM with frequency = 1/T

02101210212020102

(b). Three phase random sequence

0022110011221100221122002200110022

(c). Use repeated pulse to extend sequence period overload protection during starting    With stable lamp load (a). Signal at PPM source 1 output (b). Signal at switch driver 2 output.

(c). Voltage drop on current sampling resistor 6.

(a). Signal on master switch 5 gate
(b). Voltage drop on resistor 6
(c). Signal on slave switch 15 gate (a). signal at LMC555 pin 2.

(b). Signal at LMC555 pin 3 and 12C508 pin 2.

(c). Voltage drop on R20.

SYSTEM AND METHOD FOR PREVENTING ACOUSTIC ARC RESONANCE IN A HID LAMP

CROSS REFERENCE TO RELATED APPLICATIONS

The present application is a continuation in part of application Ser. No. 10/122,061, entitled "Electronic HID Ballast and a PPM Method of Preventing Acoustic Arc Resonance", filed on Apr. 12, 2002 now abandoned, the disclosure of which is herein incorporated by reference in its entirety.

BACKGROUND OF THE INVENTION

The present invention generally relates to High Intensity Discharge (HID) lamps and more particularly to a system and method for preventing acoustic arc resonance in HID lamps by utilizing a pulse phase modulation (PPM) switching power source.

HID lamps are widely used for outdoor lighting because of their high efficiency and long life. However, several HID lamp characteristics affect conventional HID ballast costs and reliability. Conventional HID lamps operate at low working voltages from 50V to 100V and high ignition voltages greater than 1500V. HID lamps operate at very low voltages of less than one third of the normal operating voltage after ignition until the HID lamp reaches its full power. Normally this period lasts several minutes. This characteristic requires that HID ballasts be able to withstand over load.

HID lamps further are characterized by highly dynamic characteristic loads which change instantly from low impedance to open circuit or from open circuit to low impedance. Therefore HID ballasts must have a constant power output with robust open load and over load protection.

Acoustic arc resonance (AAR) can affect HID lamp stability and damage the HID lamp. AAR can happen from several hundred Hz to several hundred KHz. The AAR may vary from HID lamp to HID lamp and may change as the HID lamp ages. AAR is not a problem for magnetic HID ballasts that work at 50 to 60 Hz power line frequency. However electronic ballasts that operate within this frequency range must deal with AAR.

Magnetic ballasts use large power transformers to handle overload during the HID lamp ignition with the attendant costs of low power factor, heavy weight, and low efficiency. Normally an expensive power capacitor is used in magnetic HID ballasts to compensate for the low power factor. High efficiency electronic HID ballasts are more efficient than magnetic ballasts as they generally are smaller, weigh less, are more efficient, and have a higher power factor. In order to replace magnetic ballasts, high efficiency electronic HID ballasts must effectively control AAR and have robust power load and over load protection achieved at a reasonable cost.

Conventional high frequency electronic HID ballasts use a pulse frequency modulation (PFM) method to prevent AAR. The major problem with PFM is acoustic noise and electromagnetic noise. The rapid frequency jumps in PFM can effectively prevent AAR but also increase the noise level. Slower frequency jumps can reduce the noise level but may not completely prevent MR. Some high frequency electronic HID ballast designs use a fast AR feedback circuit to trigger the frequency jump whenever AAR is detected. This approach can minimize acoustic noise, but introduces additional costs. The PFM method also increases ballast design difficulty because the ballast circuit needs to be optimized for multiple working frequencies.

As can be seen, there is a need in the art for a high frequency electronic HID ballast having open load and over load protection that is reliable and low cost. Preferably the high frequency electronic HID ballast operates at a low ignition frequency to extend HID lamp and starter life and to offer open load protection to the starter. Further, the high frequency electronic HID ballasts preferably operates at fixed frequency with PPM to prevent AAR.

SUMMARY OF THE INVENTION

In accordance with one aspect of the invention, a high efficiency electronic HID ballast operates at a fixed frequency with PPM to prevent AAR. The PPM can be two phase PPM or multiple phase PPM with a maximum number of contiguous pulses having a same phase of less than or equal ten pulse periods.

In another aspect of the invention, the high efficiency electronic ballast uses a pulse deduction method to prevent the ballast from over load and to prevent the HID lamp from over current during ignition. Whenever an over load condition is detected, the pulse source suspends a next pulse output to reduce the ballast's output power. In a worst case, this method can cut the output power by half.

In yet another aspect of the invention, the high efficiency electronic ballast uses a DC starter to achieve adjustable ignition frequency. The ignition frequency is adjusted to a few pulses per second. The low ignition frequency provides the DC starter with open load protection.

In yet another aspect of the invention, the high efficiency electronic ballast provides open load protection to the ballast circuit by placing the HID lamp and the power switching source in DC series. Whenever the HID lamp is disconnected, only a weak DC starter current will go through the switching power source.

In another aspect of the invention, the high efficiency electronic ballast uses a parallel LRC loop as a coupling circuit to improve power coupling efficiency between the HID lamp and the switching power source.

In yet another aspect of the invention, a method of preventing acoustic arc resonance (AAR) in a high frequency electronic ballast for a High-Intensity-Discharge (HID) lamp, includes the steps of providing a pulse source to the high frequency electronic ballast working at a Pulse-Phase-Modulation (PPM) mode with a fixed frequency to prevent AAR.

In another aspect of the invention, an electronic HID ballast, includes a power switching circuit for energizing a HID lamp, a switch driver for driving the power switching circuit, a coupling circuit for improving power coupling between the power switching circuit and the HID lamp, a PPM pulse source having a fixed frequency for driving the power switching circuit through the switch driver, a DC starter for igniting the HID lamp having an adjustable low ignition frequency, a switch current amplitude feedback circuit for detecting a power switching current pulse amplitude and sending a signal to the switch driver, and a switch current width feedback circuit for detecting a power switching current pulse width and sending a signal to the PPM pulse source.

In yet another aspect of the invention, an electronic HID ballast, includes a pulse phase modulation pulse source, a switch driver coupled to the pulse phase modulation pulse source, a switch current amplitude feedback circuit coupled to the pulse phase modulation pulse source, a switch current width feedback circuit coupled to the pulse phase modulation pulse source, a power switching circuit coupled to the pulse phase modulation pulse source, a coupling circuit coupled to the pulse phase modulation pulse source, and a DC starter circuit coupled to the pulse phase modulation pulse source.

In another aspect of the invention, a method of providing overload protection to an electronic HID ballast having a pulse phase modulation pulse source, a switch driver coupled to the pulse phase modulation pulse source, a switch current amplitude feedback circuit coupled to the pulse phase modulation pulse source, a switch current width feedback circuit coupled to the pulse phase modulation pulse source, a power switching circuit coupled to the pulse phase modulation pulse source, a coupling circuit coupled to the pulse phase modulation pulse source, and a DC starter circuit coupled to the pulse phase modulation pulse source includes the steps of detecting an overload condition, and suspending a next pulse whenever the overload condition is detected.

In yet another aspect of the invention, a method of providing open load protection to an electronic HID ballast having a pulse phase modulation pulse source, a switch driver coupled to the pulse phase modulation pulse source, a switch current amplitude feedback circuit coupled to the pulse phase modulation pulse source, a switch current width feedback circuit coupled to the pulse phase modulation pulse source, a power switching circuit coupled to the pulse phase modulation pulse source, a coupling circuit coupled to the pulse phase modulation pulse source, and a DC starter circuit coupled to the pulse phase modulation pulse source includes the step of connecting a HID lamp in series with the power switching circuit.

These and other features, aspects and advantages of the present invention will become better understood with reference to the following drawings, description and claims.

DETAILED DESCRIPTION OF THE INVENTION

The following detailed description is of the best modes of carrying out the invention. The description is not to be taken in a limiting sense, but is made merely for the purpose of illustrating the general principles of the invention, since the scope of the invention is best defined by the appended claims.

The present invention generally provides a high efficiency electronic HID ballast which operates at a fixed frequency with PPM to prevent AAR. The PPM can be two phase PPM or multiple phase PPM with a maximum number of contiguous pulses having a same phase of less than or equal ten pulse periods.

Figure 1:
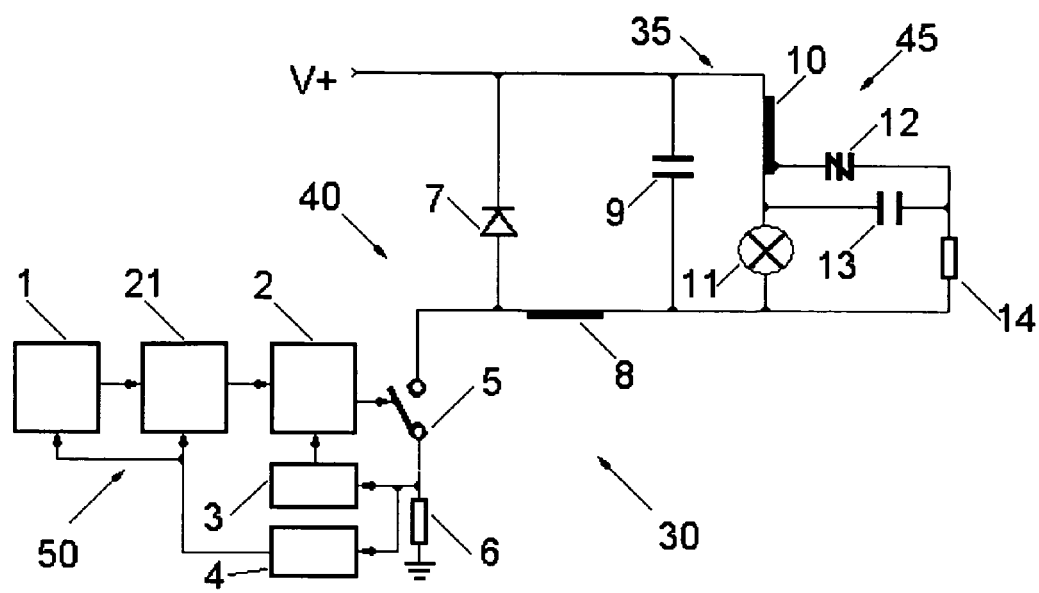
FIG. 1 is schematic of a high efficiency electronic ballast circuit in accordance with the invention.

With reference to FIG. 1, a high efficiency electronic HID ballast circuit generally designated 30 is operable to energize an HID lamp 11. The ballast circuit 30 includes a PPM pulse source 1, a pulse deduction circuit 21, a switch driver 2, a switch current amplitude feedback circuit 3, a switch current width feedback circuit 4, a switch 5, a current sampling resistor 6, a diode 7, an inductor 8, a capacitor 9, an inductor 10, a SIDAC 12, a capacitor 13, and a resistor 14.

A coupling circuit generally designated 35 includes capacitor 9 coupled in parallel to the series combination of inductor 10 and HID lamp 11. The coupling circuit 35 may be operable to improve the power coupling between the power switching circuit generally designated 40 and the HID lamp 11 and to provide a phase modulated signal to HID lamp 11. The parallel LRC connection of capacitor 9 and inductor 10 may boost the equivalent load resistance of the HID lamp 11 to the power switching circuit 40, especially during an ignition period during which time the HID lamp 11 stays at a low resistance. A higher load resistance normally results in better switching efficiency. The parameters of capacitor 9, inductor 10, and inductor 8 may be optimized based on HID lamp 11 characteristic resistance and a switching frequency to make switch 5 work at a zero current switching mode under a full load condition.

Power switching circuit 40 includes switch 5, current sampling resistor 6, diode 7, and inductor 8. The power switching circuit 40 may be used to energize HID lamp 11 through the coupling circuit 35. Switch 5 may be a MOSFET, an IGBT, or a BJT.

A PPM pulse source 1 may operate as a pulse source for power switch driver 2. The PPM pulse source 1, switch driver 2, switch current amplitude feedback circuit 3, and the power switching circuit 40 may operate as a power switching source with constant power output to energize HID lamp 11. The output of coupling circuit 35 may be a phase modulated signal.

A DC starter circuit generally designated 45 may include inductor 10, SIDAC 12, capacitor 13, and resistor 14. SIDAC 12 preferably has a breakdown voltage less that V+ but larger than HID lamp 11 working voltage and may be connected to a tap of inductor 10 with a tapping ratio greater than or equal to 15:1. Before lamp 11 is ignited, the voltage over capacitor 13 may eventually reach a SIDAC 12 breakdown voltage. A high voltage pulse over HID lamp 11 triggered by the SIDAC 12 breakdown ignites the HID lamp 11. After HID lamp 11 is ignited, a voltage over capacitor 13 may be limited by the HID lamp 11 working voltage and put the DC starter circuit 45 in a standby mode. Resistor 14 may control a charging current over capacitor 13 and may be used to adjust a HID lamp 11 ignition frequency. Ideally the DC starter circuit 45 should have an ignition frequency of a few pulses per second for open circuit protection of the DC starter circuit 45 itself.

The PPM method is widely used in digital communication systems. The PPM method can also be used in the high efficiency electronic HID ballast circuit 30 to prevent AAR. To prevent AAR, the PPM source 1 must change phase before AAR occurs. A pulse sequence having PPM advantageously eliminates AAR in HID lamp 11. A maximum number of contiguous pulses having a same phase in a PPM sequence can be used to measure the worst case of two adjacent phase shifts. Test results show that the PPM pulse source 1 output should have a maximum number of contiguous pulses having a same phase less than or equal to 10 to effectively prevent AAR in the high efficiency electronic HID ballast circuit 30. Advantageously utilizing PPM provides for no acoustic noise and lower levels of electromagnetic noise, easy optimization of coupling circuit 35 for a fixed PPM pulse source 1 frequency, and elimination of AAR related feedback circuits used in the prior art.

The PPM pulse source 1 may work at a PPM mode with a fixed frequency. The fixed pulse frequency can be from a few KHz to a few hundred KHz and the PPM pulse source 1 can utilize two or multiple phases. It has been found that to avoid low frequency AAR, the period of a PPM sequence may preferably be greater than or equal to 5 ms.

Figure 5:
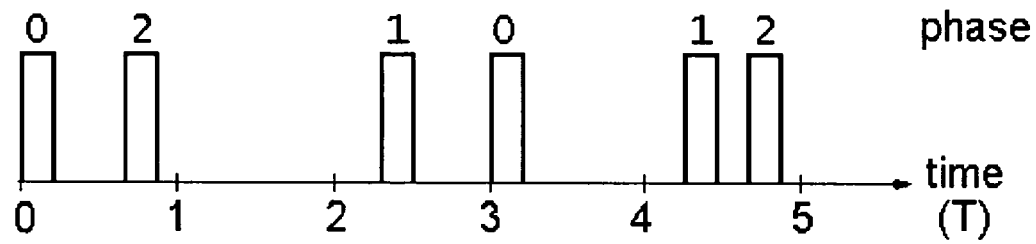
FIG. 5 is a representation of a three phase PPM, a three phase random sequence, and a sequence for extending a sequence period.

For three or more phased modulation, the PPM sequence can have a fixed number of contiguous pulses having a same phase N, with the output pulses repeated N pulse periods for each phase in the PPM sequence. FIG. 5 shows a three phased PPM sequence with N=2 and 0, 1, and 2 representing three phases.

Figure 4:
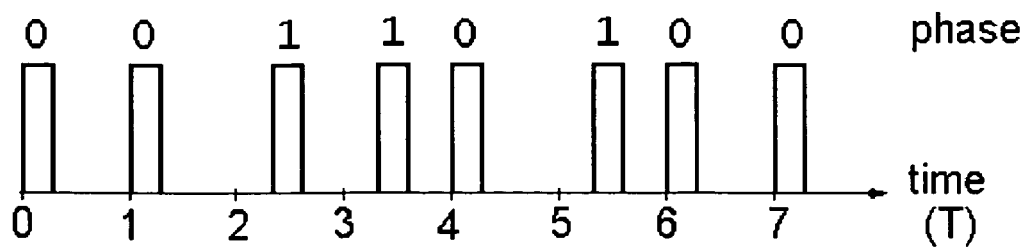
FIG. 4 is a representation of a two phase PPM and a two phase pseudo random sequence in accordance with the invention.

For two phased modulation, a $2^N-1$ binary pseudo-random sequence can be used with 0 and 1 representing two phases and the maximum number of contiguous pulses having a same phase less than or equal to N. FIG. 4 shows a two phased PPM sequence with N=5.

Figure 6:
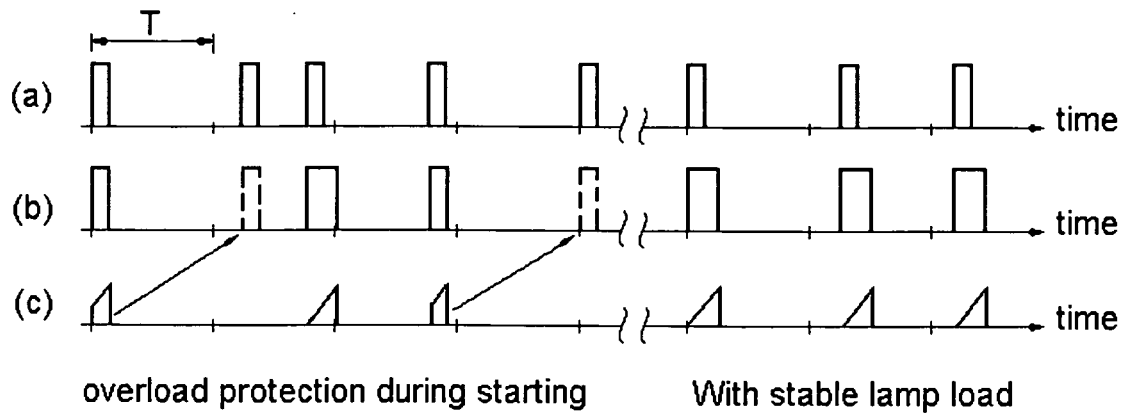
FIG. 6 is a representation showing signal traces and the effect of pulse deduction caused by over load in accordance with the invention.

Overload protection is important for electronic ballast safety, especially for HID ballasts driving high power HID lamps. A pulse deduction method may be used to protect the high efficiency electronic HID ballast circuit 30 from overload during the HID lamp 11 ignition period. An overload protection circuit generally designated 50 includes pulse deduction circuit 21 and pulse current width feedback circuit 4. An overload condition can be detected by monitoring switch current width through pulse current width feedback circuit 4. At a normal working condition, inductor 8 and switch 5 work at zero current switching mode. The overload will cause current resonance among inductor 8, capacitor 9 and inductor 10 through diode 7 that results in a smaller current pulse width on switch 5 because of the non zero current switching for switch 5 and inductor 8. Whenever an overload condition is detected, the pulse deduction circuit 21 will suspend a next pulse output to reduce power transferred to HID lamp 11. In a worst case, the pulse deduction method can cut power output by half. FIG. 6 shows how the pulse deduction method works when overload causes non-zero current switching. The pulses with shown in dotted lines a re suspended pulses because of previous smaller current pulse widths.

Open load protection is achieved by HID lamp 11 and switch 5 in a DC series connection. Whenever HID lamp 11 is disconnected, the current through switch 5 will be cut to a weak DC starter current.

In high efficiency electronic HID ballast circuit 30 shown in FIG. 1, there's a DC bias voltage over HID lamp 11. For large power lamps with long lamp tubes, this DC bias may cause uneven lighting over the lamp tube. A lower pulse frequency can help overcome the uneven light, but will result in a larger switch current and inductor size.

Figure 2:
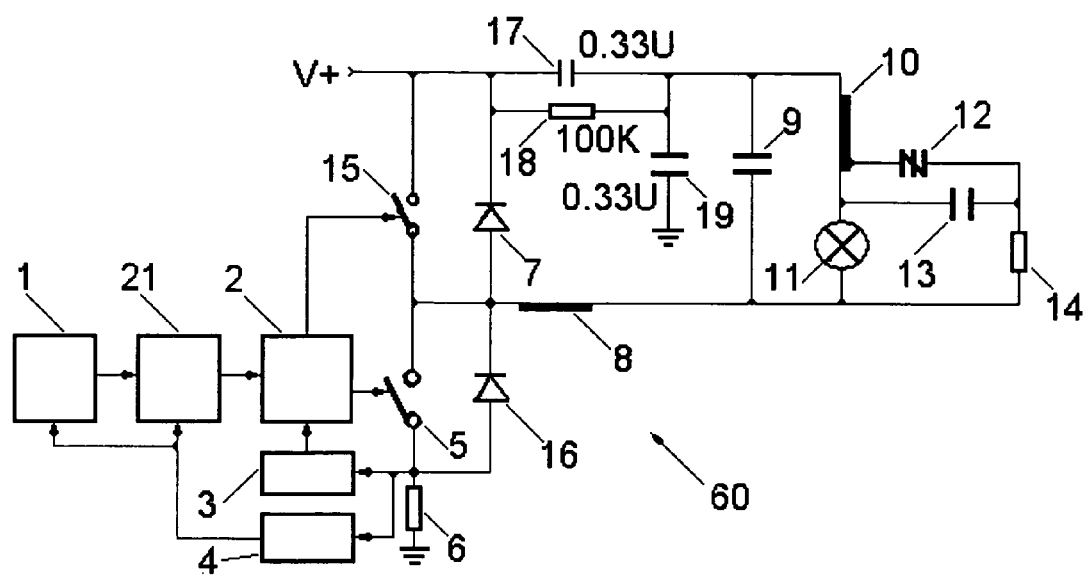
FIG. 2 is a schematic of an alternative high efficiency electronic ballast circuit in accordance with the invention.

In another aspect of the invention, a high efficiency electronic HID ballast circuit generally designated 60 shown in FIG. 2 may include slave switch 15, diode 16, capacitor 17, bleeder resistor 18, and capacitor 19. These components may remove DC bias after HID lamp 11 is ignited.

Figure 7:
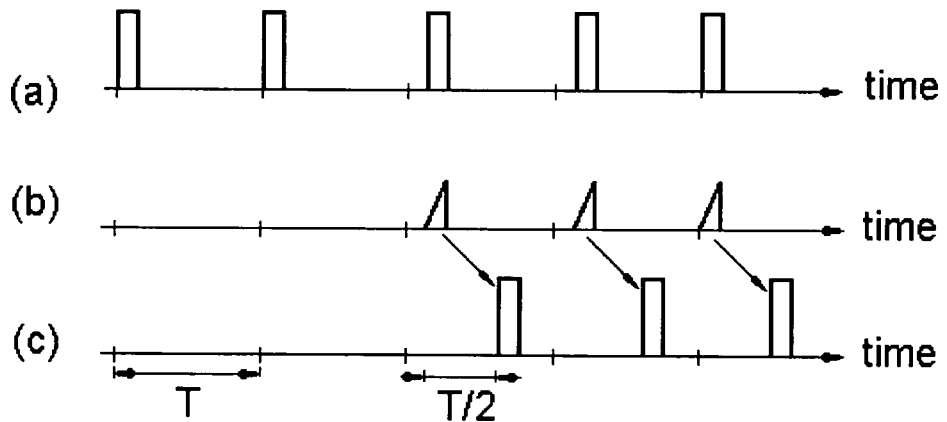
FIG. 7 is a representation showing signal traces and the operation of a slave switch in accordance with the invention.

Before HID lamp 11 is ignited, slave switch 15 is off. The voltage on capacitor 19 is V+ because of bleeder resistor 18. The high efficiency electronic HID ballast circuit 60 works the same way as high efficiency electronic HID ballast circuit 30 to ignite HID lamp 11. When a current over switch 5 is detected, slave switch 15 may be turned on at the same on time as switch 5 after a delay of a half pulse period, as shown in FIG. 7. After HID lamp 11 is ignited, switch 5 and slave switch 15 work in a push and pull mode to energize HID lamp 11 with AC current. A weak current over bleeder resistor 18 can be ignored, and the voltage over capacitor 19 is determined by the ratio of the values of capacitor 17 and capacitor 19.

Figure 3:
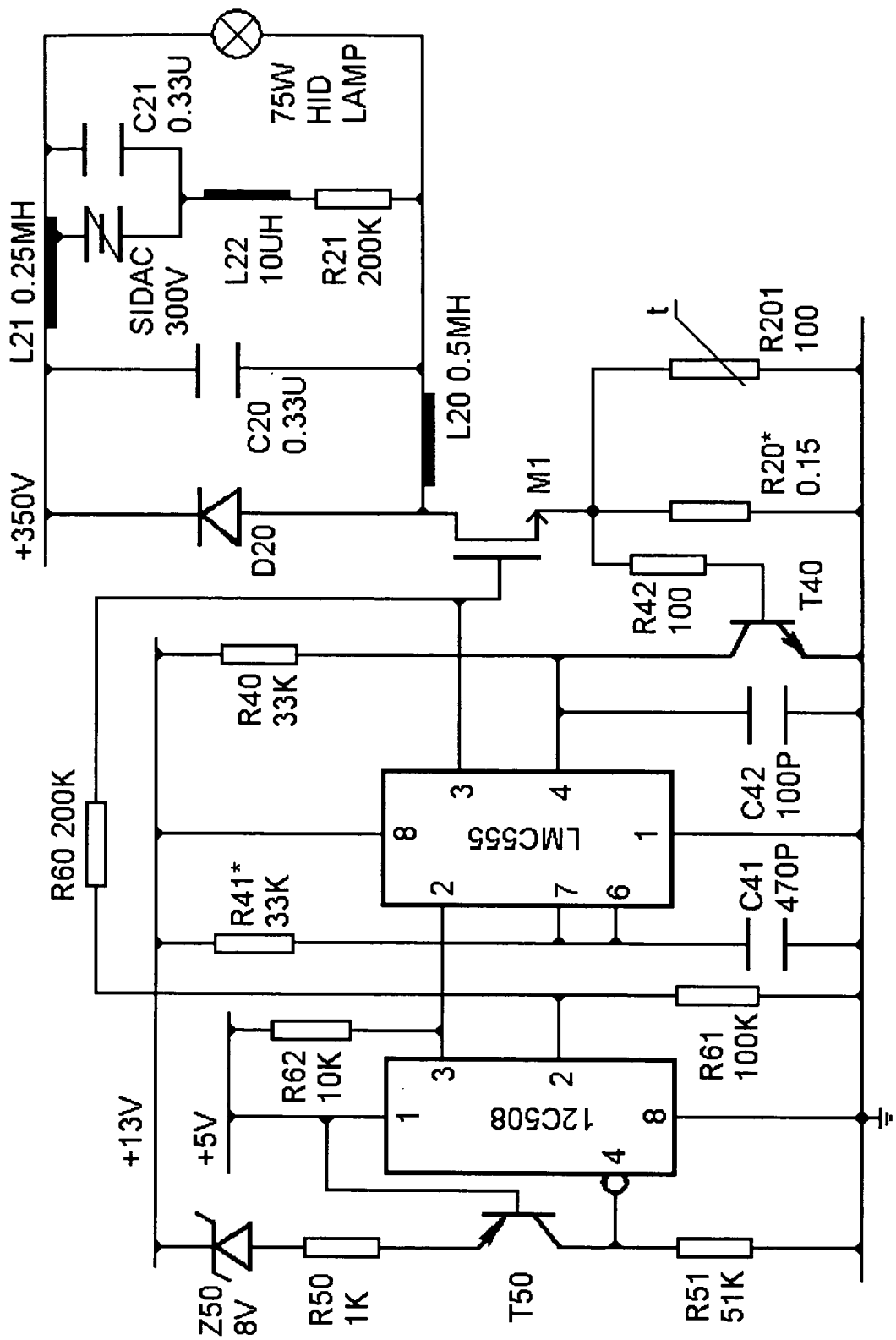
FIG. 3 is a schematic of another alternative high efficiency electronic ballast circuit in accordance with the invention.

FIG. 3 shows an implementation based on high efficiency electronic HID ballast circuit 30. Component parameters given in FIG. 3 are for a 75 w HID lamp 11. MPU chip PIC16C508 may be programmed as PPM pulse source 1 and pulse deduction circuit 21. A LMC555 may be used as switch driver 2. R60 and R61 may be used as the switch current width feedback circuit 4. R42 and T40 may be used as the switch current amplitude feedback circuit 3. Thermistor R201 with a negative temperature coefficient may be used for T40 $V_{be}$ thermal compensation. D20 may be used for diode 7, MOSFET M1 for switch 5, R20 and R201 for resistor 6, L20 for inductor 8, L21 for inductor 10, C20 for capacitor 9, C21 for capacitor 13, and R21 for resistor 14. A small inductor L22 is added into the DC starter circuit to boost the ignition pulse voltage.

R40, R41, C40, C41 and LMC555 form a standard 555 monostable circuit that outputs a positive pulse at LMC555 pin 3 for each negative input pulse at LMC555 pin 2. The output pulse width can be adjust by R40 and is set to 12 us at open load mode. LMC555 is also a pulse voltage converter that takes 5V MPU pulse input and outputs 13V pulse to drive M1.

Z50, R50, T50 and R51 combined may be used as a under voltage protection circuit for +13V power source to prevent MOSFET from overheat damage caused by unsaturated conduction. Whenever +13V power source voltage drops below 12V, the corresponding voltage drop on R51 will reset MPU to stop pulse output.

The MPU output pulses on PIC16C508 pin 3 may have a fixed period of 58 us with 3 phase PPM, and the output pulse may be a 1 us negative pulse. The three phases may be −2 us, 0 us and 2 us. The output pulse sequence may have a fixed number of contiguous pulses having a same phase of 7. The PPM sequence may have a period of approximately 7 ms.

Figure 8:
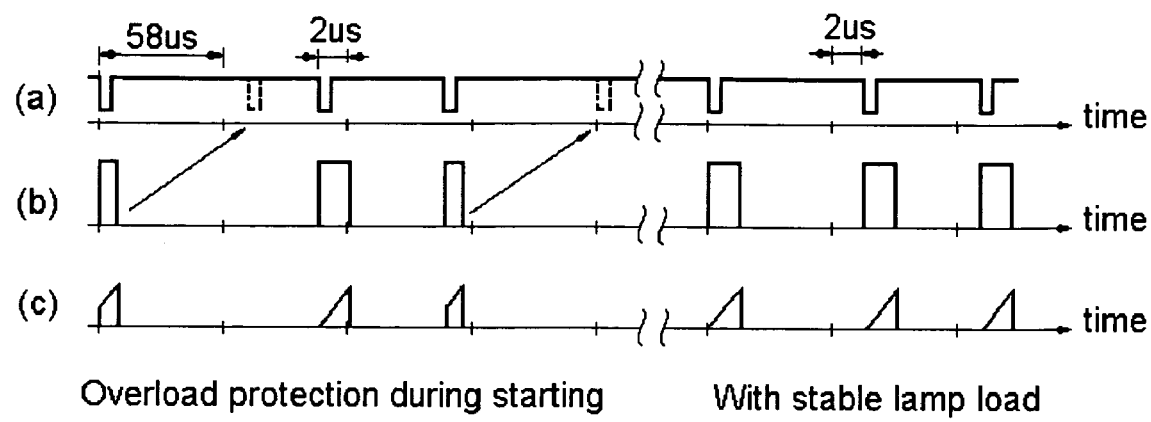
FIG. 8 is a representation showing signal traces and the effect of pulse deduction in the circuit of FIG. 3 in accordance with the invention.

At normal working conditions, the M1 current width may be approximately 8 us. The output pulse deduction is triggered whenever the M1 current width is less than 6 us. FIG. 8 illustrates how the pulse deduction works. Suspended pulses are marked with dotted lines and are trigged by a narrow current pulse.

Figure 9:
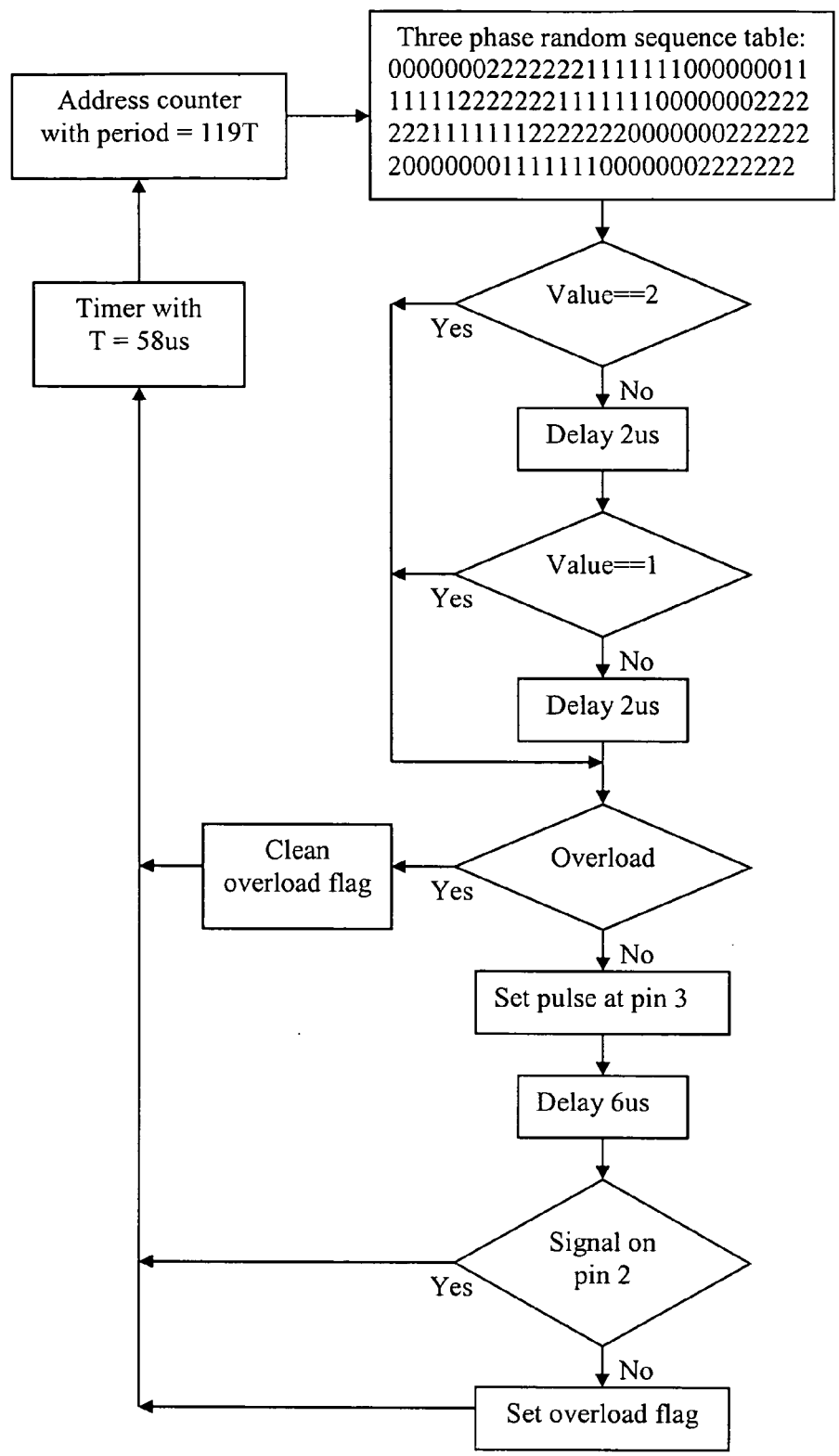
FIG. 9 is a flow diagram of a three phase pulse modulation in accordance with the invention.

FIG. 9 illustrates a program flowchart of MPU chip PIC16C508. The three phase random sequence table stored in memory is the same sequence as shown in FIG. 4 with the number of contiguous pulses having a same phase equal to 7. A timer with period=58 us is used as a PPM output clock. An address counter driven by the timer is used as address decoder to read proper value from the sequence table sequentially driven. The address counter has the same period as the sequence table size.

It should be understood, of course, that the foregoing relates to preferred embodiments of the invention and that modifications may be made without departing from the spirit and scope of the invention as set forth in the following claims.

I claim:

1. An electronic HID ballast, comprising:
   a power switching circuit for energizing a HID lamp;
   a switch driver for driving the power switching circuit;
   a coupling circuit for improving power coupling between the power switching circuit and the HID lamp;
   a pulse phase modulation pulse source having a fixed frequency for driving the power switching circuit through the switch driver;
   a DC starter for igniting the HID lamp having an adjustable low ignition frequency;
   a switch current amplitude feedback circuit for detecting a power switching current pulse amplitude and sending a signal to the switch driver; and
   a switch current width feedback circuit for detecting a power switching current pulse width and sending a signal to the pulse phase modulation pulse source.

2. The electronic HID ballast as claimed in claim 1, wherein the power switching circuit comprises a switch, an inductor, a diode and a sampling resistor, is driven by the pulse phase modulation pulse source through the switch driver, and energizes the HID lamp through the coupling circuit.

3. The electronic HID ballast as claimed in claim 2, wherein the switch in the power switching circuit comprises a MOSFET, and IGBT, or a bipolar power transistor when a proper switch driver is applied.

4. The electronic HID ballast as claimed in claim 2, further comprising a slave switch to work with the switch in the power switching circuit at a push and pull mode after the HID lamp is ignited, two capacitors to work as a voltage divider after the HID lamp is ignited and a bleeder resistor for the DC starter, whereby a DC bias over the HID lamp can be removed.

5. The electronic HID ballast as claimed in claim 2, wherein the pulse phase modulation pulse source comprises a microprocessor unit programmed as the pulse phase modulation pulse source, the switch in the power switching circuit comprises a MOSFET, the switch driver comprises a LMC555, the switch current amplitude feedback circuit comprises a transistor and a resistor, the switch current width feedback circuit comprises two resistors, and further comprising an under voltage protection circuit for preventing overheat damage to the MOSFET caused by unsaturated conduction.

6. The electronic HID ballast as claimed in claim 1, wherein the coupling circuit comprises an inductor, a capacitor and the HID lamp connected in a parallel LRC loop, and is used to boost the HID lamp's equivalent load thereby improving a power coupling efficiency.

7. The electronic HID ballast as claimed in claim 1, wherein the pulse phase modulation pulse source, the switch driver, the switch current amplitude feedback circuit and the power switching circuit work together, functioning as a power switching source with constant power output to energize the HID lamp.

8. The electronic HID ballast as claimed in claim 1, wherein the DC starter comprises a SIDAC, a capacitor, a resistor and the inductor in the coupling circuit, with the SIDAC connected to an inductor tap with a tapping ratio greater than or equal to 15:1, and has an adjustable ignition frequency controlled by the resistor.

9. The electronic HID ballast as claimed in claim 1, wherein a pulse deduction method is used for ballast overload protection comprising the pulse phase modulation pulse source suspending a next pulse output whenever an overload condition is detected.

10. The electronic HID ballast as claimed in claim 6, wherein an overload condition is detected by the switch current width feedback circuit monitoring a current pulse width of the switch in the power switching circuit.

11. The electronic HID ballast as claimed in claim 1, wherein an open load protection is achieved by connecting the HID lamp and the power switching circuit in series.

12. The electronic HID ballast as claimed in claim 1, wherein an under voltage protection circuit comprises a zener diode, a PNP transistor and two resistors.

13. An electronic HID ballast, comprising:
   a pulse phase modulation pulse source;
   a switch driver coupled to the pulse phase modulation pulse source;
   a switch current amplitude feedback circuit coupled to the pulse phase modulation pulse source;
   a switch current width feedback circuit coupled to the pulse phase modulation pulse source;
   a power switching circuit coupled to the pulse phase modulation pulse source;
   a coupling circuit coupled to the pulse phase modulation pulse source; and
   a DC starter circuit coupled to the pulse phase modulation pulse source.

14. The electronic HID ballast as claimed in claim 13, wherein the pulse phase modulation pulse source comprises a fixed frequency pulse phase modulation pulse source.

15. The electronic HID ballast as claimed in claim 14, wherein the fixed frequency ranges from 8 KHz to 200 KHz.

16. The electronic HID ballast as claimed in claim 13, wherein a maximum number of contiguous pulses having a same phase comprises 10 or less pulse periods.

17. The electronic HID ballast as claimed in claim 13, wherein a period of a pulse phase modulation comprises a period greater than or equal to 5 ms.

18. The electronic HID ballast as claimed in claim 13, wherein the pulse phase modulation pulse source comprises a two phase pulse phase modulation pulse source.

19. The electronic HID ballast as claimed in claim 18, wherein the two phased modulation of the pulse phase modulation source comprises a $2^N-1$ pseudo-random sequence and a maximum number of contiguous pulses having a same phase N is less than or equal to 10.

20. The electronic HID ballast as claimed in claim 13, wherein the pulse phase modulation pulse source comprises a three phase pulse phase modulation pulse source.

21. The electronic HID ballast as claimed in claim 20, wherein the three phase pulse phase modulation pulse source comprises a pulse phase modulation sequence having a fixed number of contiguous pulses greater than five and less than or equal to ten having a same phase, and output pulses repeated at a rate of the fixed number of contiguous pulses per phase in a pulse phase modulation sequence.

22. The electronic HID ballast as claimed in claim 13, wherein the power switching circuit comprises a switch, a current sampling resistor, a diode and an inductor, the power switching circuit being driven by the switch driver.

23. The electronic HID ballast as claimed in claim 22, wherein the switch comprises a MOSFET, an IGBT, or a bipolar power transistor.

24. The electronic HID ballast as claimed in claim 13, wherein the coupling circuit comprises a capacitor, an inductor, and an HID lamp connected in a parallel LRC loop.

25. The electronic HID ballast as claimed in claim 24, wherein the DC starter circuit comprises a SIDAC, a capacitor, a resistor, and the inductor.

26. The electronic HID ballast as claimed in claim 25, wherein the SIDAC is connected to an inductor tap with a tapping ratio greater than or equal to 15:1.

27. A method of providing overload protection to an electronic HID ballast having a pulse phase modulation pulse source, a switch driver coupled to the pulse phase modulation pulse source, a switch current amplitude feedback circuit coupled to the pulse phase modulation pulse source, a switch current width feedback circuit coupled to the pulse phase modulation pulse source, a power switching circuit coupled to the pulse phase modulation pulse source, a coupling circuit coupled to the pulse phase modulation pulse source, and a DC starter circuit coupled to the pulse phase modulation pulse source, the method comprising the steps of:

detecting an overload condition; and
   suspending a next pulse whenever the overload condition is detected.

28. The method as claimed in claim 27, wherein detecting the overload condition comprises the switch current width feedback circuit monitoring a current pulse width of the switch in the power switching circuit.

29. A method of providing open load protection to an electronic HID ballast having a pulse phase modulation pulse source, a switch driver coupled to the pulse phase modulation pulse source, a switch current amplitude feedback circuit coupled to the pulse phase modulation pulse source, a switch current width feedback circuit coupled to the pulse phase modulation pulse source, a power switching circuit coupled to the pulse phase modulation pulse source, a coupling circuit coupled to the pulse phase modulation pulse source, and a DC starter circuit coupled to the pulse phase modulation pulse source, the method comprising the step of:

connecting a HID lamp in series with the power switching circuit.

* * * * *